March 8, 1960    S. L. CARLISLE    2,927,407
INTERNAL GRINDING MACHINE
Filed April 8, 1958    2 Sheets-Sheet 2

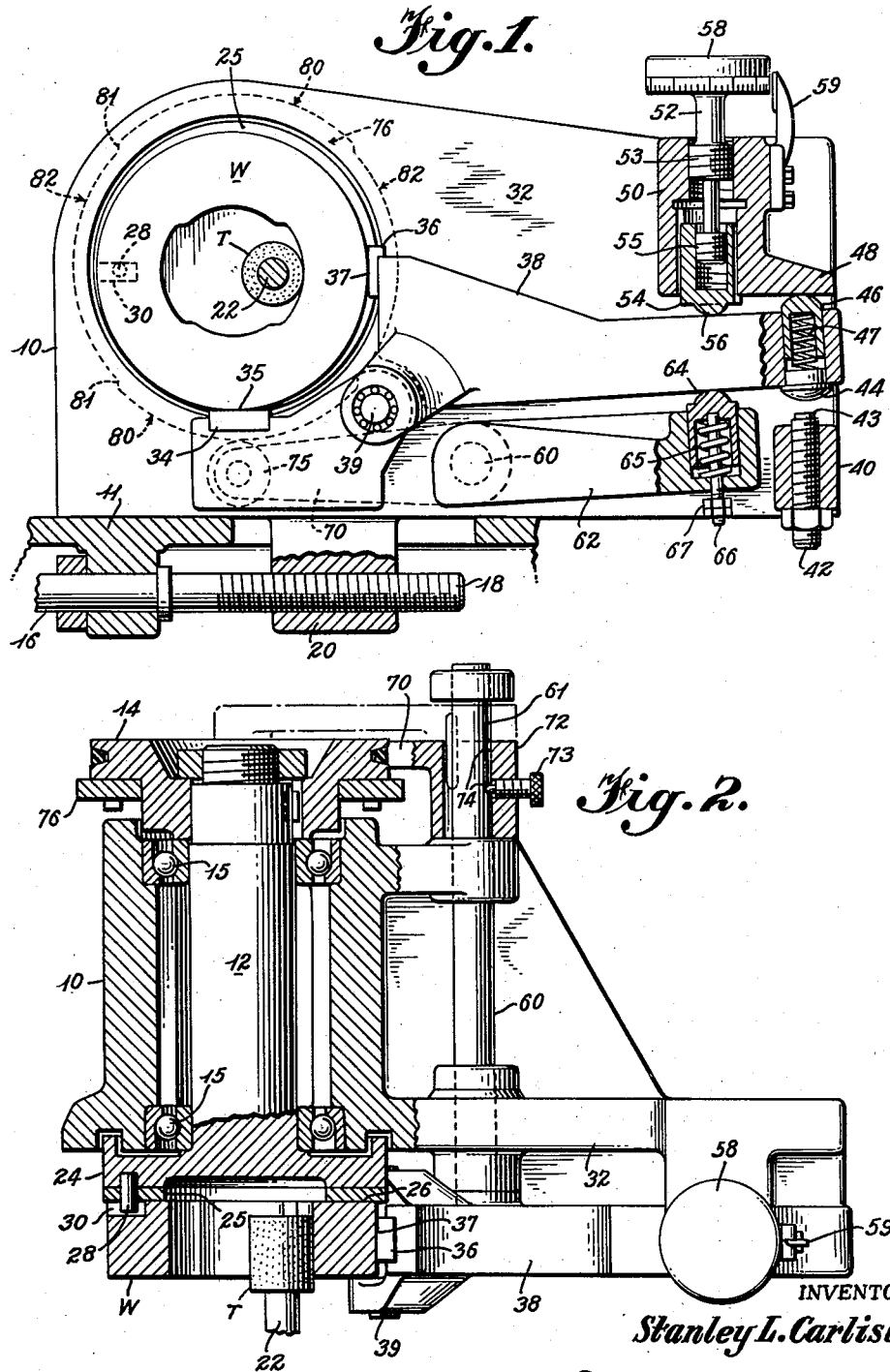

INVENTOR
Stanley L. Carlisle
BY Sughrue & Rothwell
ATTORNEYS

United States Patent Office 2,927,407
Patented Mar. 8, 1960

2,927,407

INTERNAL GRINDING MACHINE

Stanley L. Carlisle, Springfield, Vt., assignor to Bryant Chucking Grinder Company, Springfield, Vt.

Application April 8, 1958, Serial No. 727,157

7 Claims. (Cl. 51—103)

This invention relates to internal grinding machines of the centerless type wherein a workpiece with an outer preformed surface of revolution is radially supported to guide the workpiece while it is being rotated and a tool is applied to refine interior surfaces of revolution in the workpiece. More particularly, the invention relates to a method and apparatus for generating at least two different diameter surface portions in the same plane which are substantially concentric with the preformed outer supported surface.

Accordingly, this invention provides means for transversely and cyclically shifting the relative position between the axis of the tool and the rotative axis of the workpiece during each revolution of the workpiece.

This feature and related objectives will become apparent from the following description of a preferred embodiment of the invention with reference to accompanying drawings in which:

Fig. 1 is a front elevation view, partially in section of the apparatus of the invention;

Fig. 2 is a top plan view, partially in section, of the apparatus shown in Fig. 1;

Figure 3:
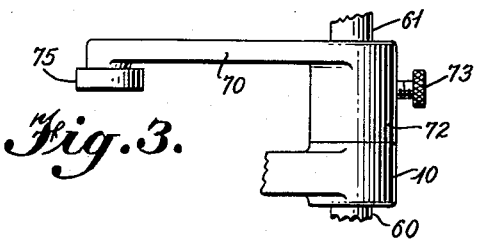
Fig. 3 is a fragmental detail view of the cam follower arm taken from Fig. 2.

Referring to the drawings, Figs. 1 and 2 show a headstock 10 supported on a machine bed 11. A shaft 12 is rotatably supported on bearings 15 in the headstock and is adapted to be driven through pulley 14 from a suitable source (not shown). In the bed 11 is journaled an axially fixed shaft 16 having a threaded portion 18 in engagement with a threaded portion of a lug 20 depending from the headstock 10 for achieving a feed movement of the headstock assembly transverse to the axis of shaft 12. A rotatable tool spindle 22 supports a tool T adapted to be placed in contact with a workpiece in a manner and for a purpose well known in the art. The axis of spindle 22 is preferably located in a plane running through the center of a support determined rotative axis of the workpiece, this plane being parallel to the feed movement. A line running through the center of spindle 22 and the support determined axis defines a line of feed.

An enlarged portion 24 of shaft 12 carries a magnetic holding element 25 having a face 26 normal to the axis of shaft 12. This face is for axially supporting a workpiece and rotatably driving the same in frictional relationship thereto. Fixedly attached to portion 24 and protruding outside face 26 is a pin 28 adapted to engage an elongated slot 30 in the workpiece W. By engagement between the pin 28 and a side of the slot 30 the workpiece W is compelled to rotate synchronously with the shaft 12 while being permitted freedom of limited movement parallel to the face 26.

The rotative axis determining means for the workpiece are supported on an apron 32 which is an integral portion of the headstock 10. These means are primarily a stationary shoe 34 fixed to the apron, and a movable shoe 36 fixed to an arm 38 pivotally supported on the apron. The shoe 34 has a face portion 35 parallel to aforesaid plane containing the line of feed. A face portion 37 of shoe 36 is located to straddle the line of feed where a wall of a workpiece may be interposed between this shoe and the tool. The pivotal axis 39 of arm 38 is preferably located at the intersection of the planes through face portions 35 and 37 when these planes are normal to each other.

The apron 32 is provided with a projecting lug 40 in which is threaded an adjustable stop screw 42 the end of which forms a limit stop 43 for the movement of the arm 38 in one direction when an anvil 44 contacts stop 43. A longitudinally movable thimble 46 nested in a cavity in arm 38 is held against a lug 48 depending from the apron 32 by a spring 47 acting between the thimble and arm 38 to continuously bias the arm 38 away from lug 48.

Also depending from the apron is another lug 50, one end of which is threaded to engage an intermediate threaded portion 53 of a shaft 52. The opposite end of the lug 50 has a splined bore in engagement with an externally splined nut 54, thereby preventing rotation of the nut whilst permitting longitudinal displacement thereof. The nut 54 has a blind hole which is threaded to engage a threaded portion 55 on the extreme end of the shaft 52. These threaded portions 53 and 55 have different screw thread leads to form a differential screw device for use as an extremely fine adjustment, as is well known in the art. The closed end of nut 54 forms an abutment 56 to contact arm 38, and the shaft 52 is provided with a hand wheel 58 having graduations on its periphery functioning as position indicating means in cooperation with a fixed pointer 59.

Parallel to shaft 12 is a shaft 60 journaled in the headstock and apron and having one end fixedly attached to a rocker arm 62 rockable in a plane parallel to the pivotal movement of arm 38. In a cavity of the rocker arm 62 is nested a thimble 64 with its closed end biased against arm 38 by a spring 65 acting between the thimble and the rocker arm. Centrally dependent from the interior of the thimble is a stem 66 passing through a hole in the bottom of the cavity. This stem is threaded on the extreme portion to accommodate nuts 67 that form an adjustable limit stop for the thimble in the direction of the force of spring 65.

The shaft 60 has an extended portion 61 supporting a follower arm 70 with a hub 72 keyed to the shaft extension, but movable between two longitudinal positions fixed by a screw 73 in the hub and defined by indentations 74—74 on the shaft. On the outer extreme of the arm 70 is supported a cam follower roll 75. A lobed cam 76 is fixed to the shaft 12 through the intermediary of the pulley 14 and is rotatable therewith.

Figure 5:
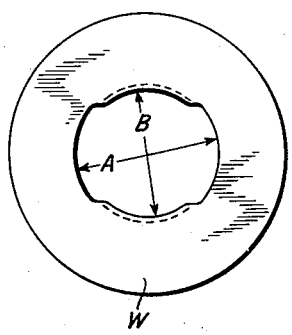
Fig. 5 is a view of a workpiece after a first surface refining operation.
Figure 6:
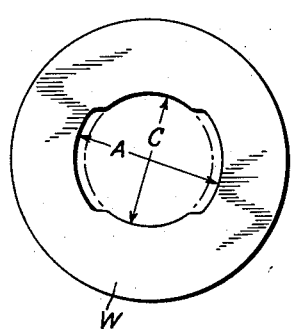
Fig. 6 is the workpiece of Fig. 5 after a second and final surface refining operation.

The operation of the device will now be explained: As as example a two diameter ring gage has been chosen for purposes of illustration, and reference may be had to Figs. 5 and 6. Fig. 6 illustrates such a ring gage in its final form, having two diametrically opposite portions defining a major diameter A and two other opposite portions defining a minor diameter C. It will be noted that the difference between A and C is for the sake of clarity grossly exaggerated. In reality the spread between these diameters is often only .0001" or less.

In general the method of making these gage rings utilizing the present invention is by a first and second operation. Fig. 5 shows the gage ring after the first operation where two portions with diameter A and two portions with diameter B have been generated by displacing the support determined axis of the workpiece relative the tool spindle axis four times during one revolution of the gage ring. During this phase only the major diameter A is sized to its final required dimension, whilst diameter B is an arbitrary dimension resulting from an aforesaid displacement which is predetermined. Diameter B is chosen so that it will be less than a desired minor diameter as indicated by dotted lines. After the dimension A is achieved, the cyclic displacement movement of the support determined axis is stopped and the gage ring is compelled to rotate about a fixed axis while the minor diameter C is sized utilizing the conventional operation of the grinder.

To form the two diameter ring gage the device operates as described below. In Fig. 1 it is seen that cam 76 has two diametrically opposite peripheral portions 80 joined by intermediate portions 81 to two other opposite peripheral portions 82 of lesser diameter. The diametrical difference between said portions 80 and 82 is chosen to be commensurate with the desired maximum difference between A and B of Fig. 5.

Figure 4:
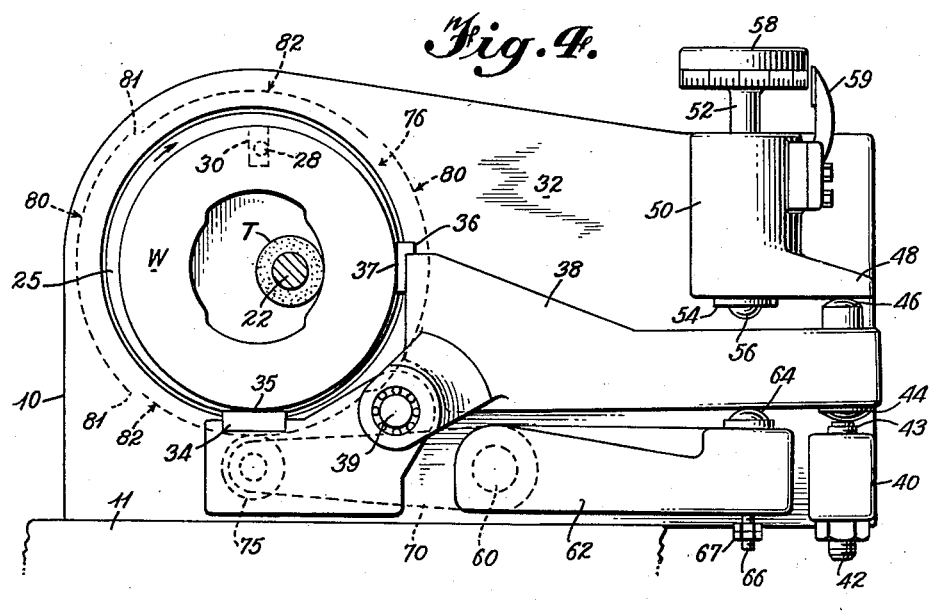
Fig. 4 is a front elevational view, similar to Fig. 1 but with the operative elements in a different position.

An annular workpiece having a pre-formed outer periphery and a pre-bored hole of lesser diameter than dimension B is placed against the face 26 of the rotating driver shaft 12 with pin 28 engaging the slot 30. Because of the resultant force of the chosen eccentric relationship between the driver axis and the rotative axis of the preformed surface on workpiece, typical of this class of grinding machines, the workpiece is compelled to be seated and radially supported by shoes 34 and 36 respectively. The follower arm 70 is placed in the full line position shown in Fig. 2 with roller 75 in contact with the periphery of cam 76, see Fig. 1, after the abutment 56 has been backed away by turning the hand wheel 58 of shaft 52 thereby permitting follower 75, whilst in contact with cam portion 80, to actuate rocker arm 62 with the result that thimble 64 will abut and lift arm 38 thereby moving shoe 36 towards the rotative center of shaft 12 and compelling the workpiece W to slide along face 35 parallel to the line of feed. The roller 75 of the follower arm 70 is held against the cam by the biasing force of spring 47 and will alternately ride against portions 80 and 82 to oscillate arm 38 during each revolution of shaft 12 and workpiece W, thereby moving shoe 36 toward and away from the center of the system, the inward movement being limited by the position of abutment 56, while the combination of the thimble 64 and spring 65 permits a desired amount of lost motion of the rocker arm 62. It will be evident that the axis of the workpiece W as determined by support shoes 35 and 36 will be reciprocated twice during each revolution thereof to thus cyclically vary the suport determined axis. The tool T may be brought in contact with the pre-bored hole of the workpiece by actuating the feed screw 16 in the proper direction commencing the grinding operation, and the shape of Fig. 5 is formed. Dimension B will be a function of the difference between the diameters 80 and 82 of the cam 76 and is, in this operative phase, of secondary importance where this dimension is chosen solely to leave stock allowance for dimension C. The spread between dimensions A and B may be varied within the range of the cam induced movement by adjusting the abutment 56 and permitting more or less overtravel of the rocker arm as afforded by spring 65. After the dimension A is established the arm 70 is axially moved to the position shown in dash-dot lines in Fig. 2 thereby moving follower 75 away from cam 76. Spring 47 will then compel arm 38 to take the position of Fig. 4 with the anvil 44 seated against the stop 43 to place the shoe 36 in a fixed position thereby locating the support determined axis of the workpiece to one single position along the line of feed. The dimension C is now ground in conventional manner to finish the workpiece as shown in Fig. 6.

An alternative method of utilizing the device is to generate both dimensions in one continuous operation. In this case the desired spread between these dimensions is governed entirely by properly adjusting the abutment 56. From the above description it will be clear that this spread may be established to be any desired amount less than the radial difference between the lobes 80 and 82 of cam 76.

The above described embodiment is susceptible to sundry variations without departing from the spirit and scope of the invention. Instead of supporting the workpiece directly on its preformed outer periphery, the workpiece may be secured in a shuttle with a circular perimeter as is in principle described in copending applications Serial No. 621,862, filed November 13, 1956 by Lovely now Patent No. 2,836,936 granted June 3, 1958, and Serial No. 729,126, filed April 17, 1958, by Terp. The driving and rotative synchronizing means of Serial No. 621,862 (now Patent No. 2,836,936) may be substituted for the above described magnetic and pin-slot driving means. Therefore applicant's invention is entitled to a reasonable range of equivalents as defined by the appended claims.

I claim:

1. In combination, an internal centerless grinding machine including a rotatable tool spindle, a grinding tool adapted to be placed in working relationship with the internal surface of an annular workpiece, a headstock containing a rotatable work driver provided with an end face portion normal to the spindle axis for axially supporting an end face of a workpiece and rotatably driving the workpiece, the tool spindle and work driver spindle being arranged for relative transverse movement along a line of feed running between the axes of the tool and work driver spindles, and improved means for radially supporting the perimeter of the workpiece for rotation about a support-determined axis, said improved work support means comprising: a first support shoe rigidly attached to the headstock for supporting the workpiece with its support determined axis located substantially on the line of feed, a second support shoe movably mounted on the headstock for movement about a pivot substantially along the line of feed for supporting the outside perimeter of the workpiece in the proximity of the line of feed, and means for rocking said feed line support shoe about its pivot in synchronism with the rotation of the work driver spindle to cyclically vary the position of the support-determined axis of the workpiece substantially along the line of feed, during each rotation thereof, whereby at least two different diameters will be generated in the internal surface of an annular workpiece.

2. A device as defined in claim 1 wherein said movable shoe is rigidly mounted on a pivotable member and said means for cyclically moving said second support shoe comprises a cam, a cam follower, and a rocker arm operable by the cam follower for moving said pivotal member.

3. A device as defined in claim 2 wherein said cam is rigidly secured to and rotatable with the work driver spindle and said cam follower is secured to a rockable and axially movable shaft mounted on said base parallel to said driver spindle and having the movable shoe rocker arm rigidly secured thereto.

4. A device as defined in claim 3 wherein an adjustable limit stop is mounted on the headstock for limiting the movement of the pivotable member in one direction; and spring means acting between the rocker arm and the said member permitting a lost motion of travel of the rocker arm whilst the pivotable member abuts said stop.

5. A device as defined in claim 4 wherein said stop may be selectively positioned in a manner to limit the movement of the pivotable member to any desired extension less than the maximum amount governed by the configuration of the cam.

6. A device as defined in claim 4 including a second adjustable stop mounted on the headstock for limiting the movement of the pivotable member in opposite direction; and spring means acting between the headstock and the member in a direction towards the second stop; means to disengage the follower from the cam, permitting said last recited spring means to seat the pivotable member against the second stop thereby placing the feed line support shoe in a predetermined position establishing a fixed single position of the support determined axis of the workpiece on the line of feed.

7. In combination, an internal grinding machine, including a headstock supporting a rotatable work driver for positively driving an annular workpiece, a tool adapted to be placed in working relationship with the interior of an annular workpiece upon which an internal surface is to be generated having at least two different diameters concentric with a preformed external surface of said workpiece, means to impart a relative transverse movement between the axes of said tool and said work driver along a line of feed running to the axis of said tool; and an improved work supporting apparatus, the work supporting apparatus comprising: a radial supporting shoe fixed to said headstock for supporting said workpiece on a line parallel with the line of feed; a movable feed line supporting shoe positioned to support said workpiece on its preformed outer perimeter substantially in the vicinity of the line of feed where a wall of the workpiece may be interposed between the tool and the shoe; means for pivotally supporting said movable feed line shoe from the headstock and cam means for cyclically rocking said movable shoe about its pivot to cyclically displace the support-determined axis of the workpiece along said line of feed during each revolution of the work driver and the workpiece.

References Cited in the file of this patent
UNITED STATES PATENTS

| | | |
|---|---|---|
| 2,694,883 | Balsiger | Nov. 23, 1954 |
| 2,795,088 | Schonhoft | June 11, 1957 |
| 2,799,977 | Jones | July 23, 1957 |
| 2,838,885 | Cann | June 17, 1958 |
| 2,838,886 | Lovely | June 17, 1958 |